Figure 1:
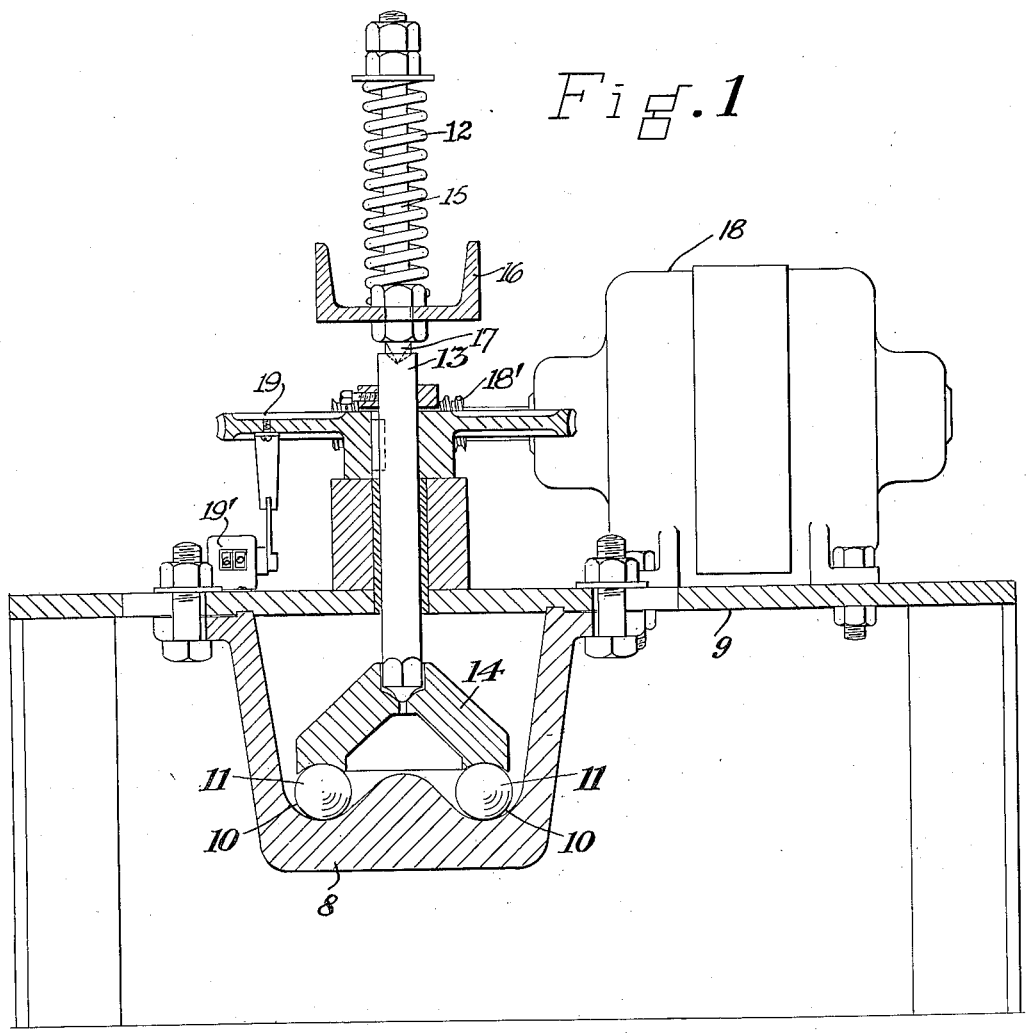

Oct. 8, 1935.  R. M. HARDGROVE  2,016,779
PROCESS OF AND APPARATUS FOR MEASURING REDUCTION IN SIZE OF SOLIDS
Filed April 8, 1931  2 Sheets-Sheet 1

INVENTOR
Ralph M. Hardgrove
BY HIS ATTORNEY

Oct. 8, 1935.   R. M. HARDGROVE   2,016,779
PROCESS OF AND APPARATUS FOR MEASURING REDUCTION IN SIZE OF SOLIDS
Filed April 8, 1931   2 Sheets-Sheet 2

INVENTOR
Ralph M. Hardgrove
BY HIS ATTORNEY

Patented Oct. 8, 1935

2,016,779

UNITED STATES PATENT OFFICE 2,016,779

PROCESS OF AND APPARATUS FOR MEASURING REDUCTION IN SIZE OF SOLIDS

Ralph M. Hardgrove, Westfield, N. J.; dedicated by said Hardgrove and Fuller Lehigh Company to the Government and the People of the United States Application April 8, 1931, Serial No. 528,575

4 Claims. (Cl. 73—51)

This invention is dedicated to the Government of the United States and the people of the United States.

My invention relates to a process for determining the quality of a material which makes it subject to subdivision under mechanical action. The invention also relates to a process for determining the ability of a machine to subdivide such a product. More particularly the invention relates to a standard process which may be employed with a standard material and then employed in identical form with a material to be tested as above indicated. It also relates to a method of comparing the results obtained by subjecting the two materials to the process. The invention is especially useful for testing the grindability of coal; or the effectiveness of a machine for grinding or pulverizing coal, but its use is not restricted thereto, as the process may be applied to any material which can be pulverized, for instance, ore, talc, rock, cement and other materials.

One object of the invention is to provide a standard method which may be employed with different materials at different times and places and produce comparable results. A further object is the provision of such a method in a form which may be easily used with a minimum of calculation. Other objects will appear upon consideration of the present specification.

Illustrated in the drawings are two types of machines which may be employed in connection with the invention. Thus—

Figure 2:
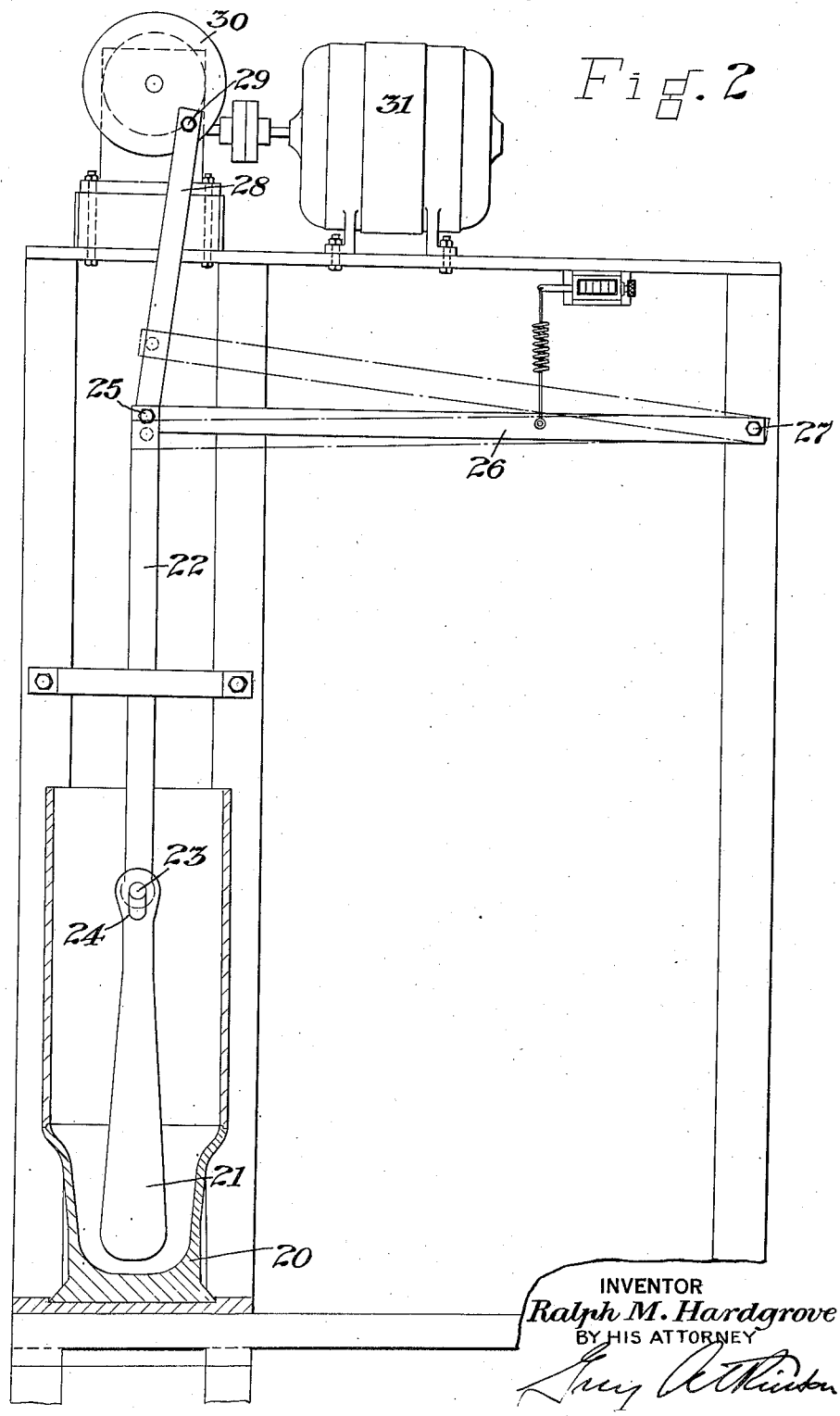

Figure 1 is a vertical midsection through a ball mill which may be used for the purpose of the invention, and Fig. 2 is a vertical section through a mortar and pestle apparatus for use in connection with the invention.

In carrying out the process which is the subject of this invention I pulverize separately but under similar conditions equal weights of the material to be tested and a standard material, both being initially divided to equal fineness. I then compare the fineness of the two results.

Accordingly, a definite weight of the two materials is selected, both being divided to a given fineness. This may be accomplished by crushing the material in any suitable apparatus. A coffee mill of the usual type has been found very satisfactory for effecting this crushing, as it produces an exceedingly small amount of fines.

A definite weight of the crushed material is now selected, between given limits of fineness: for instance, by selecting material which will pass through a screen of a given mesh but which will not pass through a screen of a smaller mesh. The same weight of a standard material and of the material whose grindability is to be tested is selected for the test samples.

These two samples are pulverized separately under similar conditions, and this may be accomplished in any suitable apparatus: for instance, a ball mill such as that illustrated in Figure 1, or a mortar and pestle apparatus like that shown in Fig. 2. In either case both samples are subjected to a definite process of pulverization, that is to say—a process which is identical in each instance. This process does not carry pulverization to completion or to a point where approximately a uniform size of pulverized material is obtained, but ceases well short of this point. Thus, substantially the full efficiency of the apparatus is realized, and no cushioning action due to an excess of finely pulverized material impedes the action of the apparatus.

The samples are preferably pulverized in a grindability machine constructed as shown in Fig. 1. The sample is deposited in a receptacle 8 removably attached to the underside of a table 9 and having a circular grinding track 10 formed in the bottom thereof. The material is pulverized by causing a circular row of grinding balls 11 to move about the track for a definite number of revolutions. The grinding balls are given an adjustable grinding pressure by means of a pair of springs 12 mounted on parallel vertical stationary rods 15 and acting on a horizontal channel 16 floatably mounted on the rods 15. The channel 16 carries an adjustable center screw 17 abutting the upper end of a drive shaft 13 which extends through the table 9 into the grinding chamber formed within the receptacle 8. The lower end of the shaft 13 is recessed in and rotates a circular ring 14 bearing upon the grinding balls. The shaft 13 is driven from an electric motor 18 through a worm 18' and a worm wheel 19 having a floating drive connection with the shaft 13. A revolution counter 19' is mounted on the table and operatively connected to the worm wheel 19 as indicated. In lieu of the adjustable pressure springs described, weights of predetermined mass can be used to subject the shaft 13, and thereby the grinding balls, to a predetermined grinding pressure. After each sample has been subjected to the pulverizing action of the balls which have made the same number of revolutions about the track 10 in each case, they are ready for the comparison of grindability.

Instead of the ball mill which has just been described, a mortar and pestle apparatus such as that shown in Fig. 2 may be employed. In this case each sample is placed in the mortar 20 and is subjected to the pounding action of the pestle 21 for a definite number of strokes. The pestle is operated through a link 22 which has a pin 23 engaging with a slot 24 in the upper end of the pestle. The opposite end of the link 22 is pivoted at 25 to the end of a lever 26 whose other end is pivoted at 27 to the frame of the machine. A connecting rod 28 also has one end pivoted to the link 22 and the lever 26 at 25. The other end of the connecting rod 28 is pivoted at 29 to a wheel 30 which is driven in conventional manner from a motor 31.

In operation, rotation of the wheel 30 lifts the pestle from contact with the mortar by means of the pin 23 engaging with the slot 24 therein. The motor 31 acts through the members named to raise the pestle and as the pivot 29 passes dead center at the top of its travel, the pestle is allowed to drop into the mortar. The travel of the pivot 29 is just a little more than the distance the pestle is raised above the bottom of the mortar and the speed of operation is such that the fall of the pestle due to gravity is a little slower than the actual travel of the pivot 29. Thus, a true dropping motion of the pestle is produced. However, the pestle does not travel consistently with a vertical motion due to the effect of the lever 26 upon the pivot 25 through which the link 22 is actuated. The pestle is thus given a swinging motion which permits it to hit in various positions thereby working all over the bottom of the mortar.

After the same number of strokes of the pestle has been given each sample, the two pulverized materials are in condition for comparison.

When the two samples, that is to say—the sample of the standard material and that of the material under test, have been pulverized under identical conditions they are compared in order to obtain a measure of the grindability of the material under test. This comparison is based upon Rittinger's law, which states that the work done in grinding is proportional to the new surface produced. If the work is the same in each case comparison of the new surfaces produced will give a comparison of the grindability of the two materials. The new surface produced is a function of the change in diameter of the particles, and this change in diameter may be measured by the difference between the initial diameters of the particles and their final diameters. This difference may be measured by comparing the size of screen through which the final particles will pass with the size of screen through which the original particles would pass.

In accordance with the above, the pulverized product in each case is screened through a series of screens and the weight of material caught by each screen is noted.

Since a start was made with the standard material and the material under test in the same condition of division and since the same identical process has been employed in connection with each, the grindability of the material under test may be determined directly by comparison of the different sizes disclosed by the screens with the different sizes similarly disclosed in the case of the standard material.

Obviously, the standard sample need not be pulverized each time a test is made. A standard process being developed, and the new surfaces produced upon this standard sample by the standard process having been determined, only the test sample need be pulverized to make the comparison.

Two examples of how the process may be applied are given below:

*Example I*

A sample of 150 grams of the coal to be tested is crushed in a coffee mill until all of it will pass through a 16-mesh screen. This material is then screened on a 30-mesh screen, that going through the screen being rejected.

A further sample of 50 grams of the product which has passed a 16-mesh screen and which will not pass the 30-mesh screen, is placed on the circular track or lower grinding ring of a ball mill such as that illustrated in Figure 1 of the drawings. A pressure of 30 lbs. is applied to the balls through the upper grinding ring and the apparatus is rotated at 21 R. P. M. for 60 revolutions of the upper grinding ring.

The partly pulverized sample is now removed from the mill and screened in a series of United States standard screens in accordance with the following table:

| U. S. Standard screen mesh | Opening inches | Percent of sample caught on screen | Average diameter of particles | Factor= reciprocal of diameter |
|---|---|---|---|---|
| 16 | .046 | | | |
| 30 | .0232 | 24.4 | .0346 | 29= 708 |
| 60 | .0097 | 36.0 | .01645 | 61= 2196 |
| 100 | .0058 | 13.8 | .00775 | 129= 1780 |
| 140 | .0041 | 7.2 | .00495 | 202= 1454 |
| 200 | .0029 | 3.8 | .00350 | 285= 1084 |
| 230 | .0024 | 1.6 | .00265 | 377= 602 |
| 300 | .0019 | 2.4 | .00215 | 465= 1116 |
| (Through 300) | | 10.8 | .00100 | 1000=10800 |
| Total surface units | | | | 19740 |

The first column gives the different meshes in the series of screens. The second column gives the openings in each screen in inches. The third column gives the per cent. by weight of the sample caught on each screen (it being remembered that the sample was originally crushed to a size which would pass a 16-mesh screen). The fourth column gives the average diameter of particles caught on each screen, this average diameter being assumed as the average between the opening in the screen through which the material passed and that in the screen upon which the material was caught. The fifth column gives a figure which is the reciprocal of the average diameter given in the fourth column. The average diameter of material passing through the 300-mesh screen is assumed to be 0.00100 inch, which is probably not far from the truth. In any case the same assumption is made with respect to both the standard sample and the sample under test. The sixth column gives the product of the per cent. (given in column 3) multiplied by the factor given in column 5, and the result is proportional to the total surface of the particles. The product given in column 6, I designate "surface units". By adding all the surface units in column 6 a figure representing the total surface of all of the particles of the partly pulverized sample is obtained.

Since all of the particles of the sample before pulverization would pass a 16-mesh screen, and would not pass a 30-mesh screen, the factor for the 50 grams selected for pulverization is 29 (see column 5). The original surface is therefore represented by 100% multiplied by this factor 29 which equals 2900.

According to Rittinger's law, the work done in pulverizing a material is proportional to the new surface produced. Therefore, the new surface is represented by the difference between the total surface before pulverization and the total surface after pulverization or 19,740 less 2900, which gives us 16,840.

Treating a similar sample of 50 grams of a standard material which will pass a 16-mesh screen, but which will be caught on a 30-mesh screen, in identical manner, gives us 29,961 new surface units; and the grindability of the material under test is the quotient obtained from dividing the new surface units produced in the sample to be tested by the new surface units produced in the standard product. Thus—

$$\text{Grindability} = \frac{16840}{29961} = 56.2 \text{ per cent.}$$

*Example II*

In a similar manner 150 grams of coal to be tested is crushed in a coffee mill until all of it will pass through a 16-mesh screen. The crushed material is subsequently screened on a 30-mesh screen and the material passing through the latter screen is rejected.

A sample of 40 grams of the material which will pass a 16-mesh screen but which will not pass a 30-mesh screen, is placed in a mortar such as that shown in Fig. 2, and is pulverized by 1300 strokes of a pestle in a manner already described.

The product is then passed through a series of screens after the manner described in Example I. The following table gives the corresponding values for the determination made in this case, the process of screening and determining the surface units being the same as in Example I:

| U. S. standard screen mesh | Opening inches | Per cent of sample caught on screen | Average diameter of particles | Factor=reciprocal of diameter |
|---|---|---|---|---|
| 16 | .046 | | | |
| 30 | .0232 | 39.0 | .0346 | 29= 1131 |
| 60 | .0097 | 27.6 | .01645 | 61= 1684 |
| 100 | .0058 | 10.0 | .00775 | 129= 1290 |
| 140 | .0041 | 4.6 | .00495 | 202= 929 |
| 200 | .0029 | 3.8 | .00350 | 285= 1183 |
| 230 | .0024 | 1.7 | .00265 | 377= 641 |
| 300 | .0019 | 2.0 | .00215 | 465= 930 |
| (Through 300) | | 11.3 | .00100 | 1000=11300 |
| Total surface units | | | | 19088 |

The columns in the above table correspond to those in the table given under Example I, and the original surface of the 40 gram sample is, of course, represented by 100% multiplied by the factor 29 or 2900 surface units exactly as was the case in Example I. Subtracting the 2900 initial surface units from the total surface units given in column 6 (19088 surface units) gives us a net of 16184 new surface units produced.

The new surface units for the standard sample were 30426 and dividing the surface units obtained for the sample under test by this figure gives a grindability of 53.2 per cent. The equation is—

$$\text{Grindability} = \frac{16184}{30426} = 53.2 \text{ per cent.}$$

As has been explained, a standard method is provided which may be employed with different materials at widely separated places and at different times, the results being in all cases of a nature which may be compared. It will be observed that a minimum of calculation is required in order to determine the grindability of any sample. This is brought out clearly in the two examples given.

The way in which this process may be used to determine the ability of a machine to subdivide a solid involves a very slight variation of the process already described. It consists merely in comparing two machines by subjecting samples of the same material to identical processes in each.

Accordingly, the process comprises pulverizing in the two separate pieces of apparatus to be compared, under similar conditions, equal weights of a given solid, and comparing the fineness of the resulting samples of pulverized material. More specifically, the process comprises crushing a mass of the solid material to a given fineness, as above described, selecting between limits of fineness two samples of this crushed material, the samples being of equal weight, and subjecting these two samples to the same definite process of pulverization in the two pieces of apparatus. The method of pulverization has already been given in detail. The new surface produced is now computed according to the above description, and a comparison of this new surface will give a comparison of the two pieces of apparatus, since two identical samples have been used and have been subjected to the same process—one in each of the pieces of apparatus.

It is not intended that the invention shall be limited to the precise method specifically described herein by way of illustration. Variations which do not depart from the proper scope of this invention will naturally occur to those familiar with making similar tests. With this understanding, therefore,

I claim:

1. The method of determining the relative grindability of a material which comprises subjecting a sample of the material in which all the particles are of substantially the same diameter to a definite process of incomplete pulverization, screening the partly pulverized sample, and computing the amount of new surface produced by the pulverizing operation by multiplying the sized portions of the sample by constants respectively corresponding to the reciprocals of the average opening for material between successive screen sizes.

2. The method of determining the relative grandability of a material which comprises subjecting a sample of the material in which all of the particles are of substantially the same diameter to a definite process of incomplete pulverization, screening the partly pulverized sample, computing the amount of new surface produced by multiplying the sized portions of the sample by factors, respectively reciprocals of the average diameter of the particles of each size, and comparing the amount of new surface to that obtainable in a similar way on a material of 100% grindability.

3. Apparatus for determining the relative grindability of a material comprising a table, a receptacle removably attached to the underside of said table and uniting therewith to form a closed grinding chamber, a grinding surface in the bottom of said chamber, rolling grinding elements positioned on said grinding surface, a rotary plate supported on said grinding elements, a drive shaft operatively connected to said rotary plate and extending through said table, means for impressing a grinding pressure on said rotary table, and means for rotating said drive shaft.

4. Apparatus for determining the relative grindability of a material comprising a table, a receptacle removably attached to the lower side of said table and uniting therewith to form a closed grinding chamber, an annular grinding surface in the bottom of said chamber, an orbital row of rolling grinding elements positioned on said grinding surface, a rotary plate supported on said grinding elements, a drive shaft operatively connected to said rotary plate and extending through said table, means for loading said rotary table with a predetermined grinding pressure, an electric motor mounted on said table and operatively connected to said drive shaft, and means for measuring the work input to said grinding chamber.

RALPH M. HARDGROVE.